US011242230B2

(12) United States Patent
Kou et al.

(10) Patent No.: US 11,242,230 B2
(45) Date of Patent: Feb. 8, 2022

(54) MINE EXPLOSION-ISOLATING HOISTING DEVICE WITH BUILT-IN TYPE PERMANENT MAGNET MOTOR

(71) Applicants: TAIYUAN UNIVERSITY OF TECHNOLOGY, Shanxi (CN); Guiyang Plateau Machinery Company Limited, Guizhou (CN)

(72) Inventors: Ziming Kou, Taiyuan (CN); Zhensheng Wang, Guiyang (CN); Juan Wu, Taiyuan (CN); Deling Xie, Taiyuan (CN); Yandong Wang, Taiyuan (CN); Yinru Bai, Taiyuan (CN); Keliang Zhu, Taiyuan (CN); Waiwen Zhang, Taiyuan (CN); Li'nan Zhang, Taiyuan (CN); Lipeng Zhu, Taiyuan (CN)

(73) Assignees: TAIYUAN UNIVERSITY OF TECHNOLOGY, Taiyuan (CN); Guiyang Plateau Machinery Company Limited, Guiyang (CN)

( * ) Notice: Subject to any disclaimer, the term of this patent is extended or adjusted under 35 U.S.C. 154(b) by 83 days.

(21) Appl. No.: 16/879,987

(22) Filed: May 21, 2020

(65) Prior Publication Data
US 2021/0261389 A1 Aug. 26, 2021

(30) Foreign Application Priority Data
Feb. 26, 2020 (CN) .......................... 202010121294.9

(51) Int. Cl.
*B66D 1/12* (2006.01)
*H02K 5/16* (2006.01)
(Continued)

(52) U.S. Cl.
CPC ............... *B66D 1/12* (2013.01); *H02K 5/165* (2013.01); *H02K 9/19* (2013.01); *B66D 1/60* (2013.01);
(Continued)

(58) Field of Classification Search
CPC .... B66D 2700/0141; B66D 2700/0183; B66D 2700/025; B66D 1/12; B66D 1/60; H02K 5/165; H02K 5/15; H02K 9/19
See application file for complete search history.

(56) References Cited

U.S. PATENT DOCUMENTS 6,891,299 B2 * 5/2005 Coupart .................... B66D 1/12
310/152
8,672,059 B2 * 3/2014 Williams .................. B66D 1/12
175/162
(Continued)

FOREIGN PATENT DOCUMENTS

CN 103296805 A 9/2013
CN 203284021 U 11/2013
(Continued)

*Primary Examiner* — Michael E Gallion
(74) *Attorney, Agent, or Firm* — Cooper Legal Group, LLC

(57) ABSTRACT

A mine explosion-isolating hoisting device with a built-in type permanent magnet motor includes a spindle fixed on the ground; a permanent magnet motor stator fixed on the spindle; a drum rotating relative to the spindle, the drum surrounding the spindle circumferentially; and a permanent magnet motor external rotor fixed by a spoke plate and rotating relative to the spindle; the drum is connected to the permanent magnet motor external rotor via an isolating disc; and a radial distance between an outer circumferential surface of the permanent magnet motor external rotor and an inner wall of the drum is greater than a preset value.

9 Claims, 17 Drawing Sheets

(51) Int. Cl.
*H02K 9/19* (2006.01)
*B66D 1/60* (2006.01)
*H02K 5/15* (2006.01)

(52) U.S. Cl.
CPC ............... *B66D 2700/0141* (2013.01); *B66D 2700/0183* (2013.01); *B66D 2700/025* (2013.01); *H02K 5/15* (2013.01)

(56) References Cited

U.S. PATENT DOCUMENTS

| | | | |
|---|---|---|---|
| 9,556,008 B2* | 1/2017 | Ogden | B66D 1/12 |
| 10,022,570 B2* | 7/2018 | Krupp | H02K 49/046 |
| 10,870,562 B2* | 12/2020 | Thirunarayana | B66D 1/12 |
| 11,041,282 B2* | 6/2021 | Laghi | E02F 3/26 |

FOREIGN PATENT DOCUMENTS

| | | |
|---|---|---|
| CN | 204057093 U | 12/2014 |
| CN | 108155768 A | 6/2018 |
| CN | 108313857 A | 7/2018 |
| CN | 108357864 A | 8/2018 |
| CN | 207853591 U | 9/2018 |
| CN | 108862074 A | 11/2018 |
| CN | 208087111 U | 11/2018 |
| CN | 208166439 U | 11/2018 |
| CN | 208190362 U | 12/2018 |
| CN | 109368466 A | 2/2019 |
| EP | 3429069 A1 | 1/2019 |
| JP | H0781889 A | 3/1995 |

\* cited by examiner

MINE EXPLOSION-ISOLATING HOISTING DEVICE WITH BUILT-IN TYPE PERMANENT MAGNET MOTOR

CROSS-REFERENCE TO RELATED APPLICATIONS

The present application claims benefit of Chinese Patent Application No. 202010121294.9, filed on Feb. 26, 2020, the contents of which are hereby incorporated by reference in their entirety.

TECHNICAL FIELD

The disclosure relates to the field of mine devices, and in particular to a mine explosion-isolating hoisting device with a built-in type permanent magnet motor.

BACKGROUND

A mine explosion-isolating winch is applied to flammable and combustible special working environments with a high gas and the like such as a shaft of a coal mine, a metal mine, and a non-metal mine, and configured to hoist a material or a person, etc. However, the existing explosion-isolating hydraulic winch and the traditional explosion-isolating three-phase asynchronous motor and decelerator type winch have the defects that the failure rate is high, the reliability is not high and the operation is also not stable enough due to a large load and an evil service environment.

SUMMARY

In view of this, an objective of the embodiment of the disclosure is to provide a mine explosion-isolating hoisting device with a built-in type permanent magnet motor, which can improve the reliability and operation stability of the hoisting device.

To achieve the above objective, the technical solutions in the embodiment of the disclosure are implemented as follows.

A mine explosion-isolating hoisting device with a built-in type permanent magnet motor includes: a spindle, a permanent magnet motor stator, a drum and a permanent magnet motor external rotor.

The spindle is fixed on the ground.

The permanent magnet motor stator is fixed on the spindle.

The drum rotates relative to the spindle, and the drum surrounds the spindle circumferentially.

The permanent magnet motor external rotor is fixed by a spoke plate and rotates relative to the spindle.

The drum is connected to the permanent magnet motor external rotor via an isolating disc.

A radial distance between an outer circumferential surface of the permanent magnet motor external rotor and an inner wall of the drum is greater than a preset value.

In the above solutions, the spoke plate is respectively disposed on two ends of the permanent magnet motor external rotor; an outer end of the spoke plate is fixed on the external rotor, and an inner end of the spoke plate is connected to the spindle via a bearing; and one end of the isolating disc is fixed on the inner wall of the drum, and the other end of the isolating disc is fixed on the outer end of the spoke plate.

In the above solutions, the permanent magnet motor external rotor includes a cylindrical housing and an even group of permanent magnets fixed on an inner wall of the cylindrical housing, each group of permanent magnets are arranged along an axial direction by multiple permanent magnets having same magnetic poles, and each permanent magnet in a same group is deviated for a preset angle to one side in sequence on the axial direction.

In the above solutions, at least one explosion-isolating junction surface is provided at a junction between the cylindrical housing and the spoke plate, and a length, a gap and a surface roughness of the explosion-isolating junction surface are in conformity to a preset requirement.

In the above solutions, the device further includes a cooling apparatus for cooling the permanent magnet motor stator, the cooling apparatus includes a cooling liquid cavity for accommodating a cooling liquid, and at least one outer wall of the cooling liquid cavity is propped against a stator iron core of the permanent magnet motor stator.

In the above solutions, the cooling liquid cavity is a sealed annular cavity surrounding an inner wall of the stator iron core, and an outer circumferential surface of the sealed annular cavity is propped against the inner wall of the stator iron core.

In the above solutions, the cooling apparatus further includes a cooling liquid pipeline for conveying the cooling liquid from the outside, and one end of the cooling liquid pipeline leads into the cooling liquid cavity, and the other end of the cooling liquid pipeline extends out of the permanent magnet motor via the spindle; and the cooling liquid pipeline is provided, at a position outside the permanent magnet motor, with an explosion-isolating pipeline for performing explosion isolation on the cooling pipeline, and the explosion-isolating pipeline has multiple flow channels capable of circulating the cooling liquid.

In the above solutions, the device further includes a stator support, the stator support includes at least two support plates supporting the stator iron core on two ends of the stator iron core respectively, and one end of the support plate is fixed on the spindle, and the other end of the support plate is configured to support the stator iron core; the device further includes a propping ring propped against an inner circumference of the stator iron core, and a sealing ring connecting the two support plates and having a preset distance away from the propping ring; and the propping ring, the sealing ring and the two support plates are enclosed to form the cooling liquid cavity.

In the above solutions, the spindle includes a wiring channel for connecting a lead wire of the stator to a power supply, and one end of the wiring channel axially penetrates through an end surface of one end of the spindle along a central line of the spindle, and the other end of the wiring channel penetrates out along a radial direction of the spindle at a corresponding position of the stator; and an epoxy resin for blocking a sectional space of the wiring channel is further included in the wiring channel, and the lead wire of the stator passes through the epoxy resin.

In the above solutions, the device further includes a magnetic pole position detection apparatus, the magnetic pole position detection apparatus includes a sine-cosine encoder, and the sine-cosine encoder is fixed on the spindle, corresponding to the permanent magnet motor external rotor, in the cylindrical housing.

The mine explosion-isolating hoisting device with a built-in type permanent magnet motor provided by the embodiment of the disclosure includes a spindle fixed on the ground; a permanent magnet motor stator fixed on the spindle; a drum surrounding the spindle from a circumference of the spindle and rotating relative to the spindle; and a permanent magnet motor external rotor fixed on an inner wall of the drum; and a radial distance between an outer circumferential surface of the permanent magnet motor external rotor and the inner wall of the drum is greater than a preset value. Therefore, according to the mine explosion-isolating hoisting device with a built-in type permanent magnet motor provided by the embodiment of the disclosure, the permanent magnet motor external rotor and the drum are of a split structure; through an isolating disc, the drum is independent of the permanent magnet motor external rotor and operates with the permanent magnet motor external rotor synchronously; and by separating a preset distance along a radial direction, a load borne on the drum is not transferred to the permanent magnet motor external rotor, thus guaranteeing that change values of an air gap between the external rotor and a stator iron core of the permanent magnet motor and an explosion-isolating gap on an explosion-isolating junction surface of the permanent magnet motor due to an external load are within a preset range. The disclosure can improve the reliability and operation stability of the hoisting device.

Other beneficial effects of the embodiment of the disclosure are further described in combination with specific technical solution in the detailed description.

BRIEF DESCRIPTION OF THE DRAWINGS

In order to describe the technical solutions in the embodiment of the disclosure more clearly, a simple introduction on the accompanying drawings which are needed in the description of the embodiment is given below. It should be understood that the accompanying drawings in the description below are merely some of the embodiments of the disclosure, based on which other drawings may be obtained by a person of ordinary skill in the art without any creative effort.

DETAILED DESCRIPTION

Figure 1:
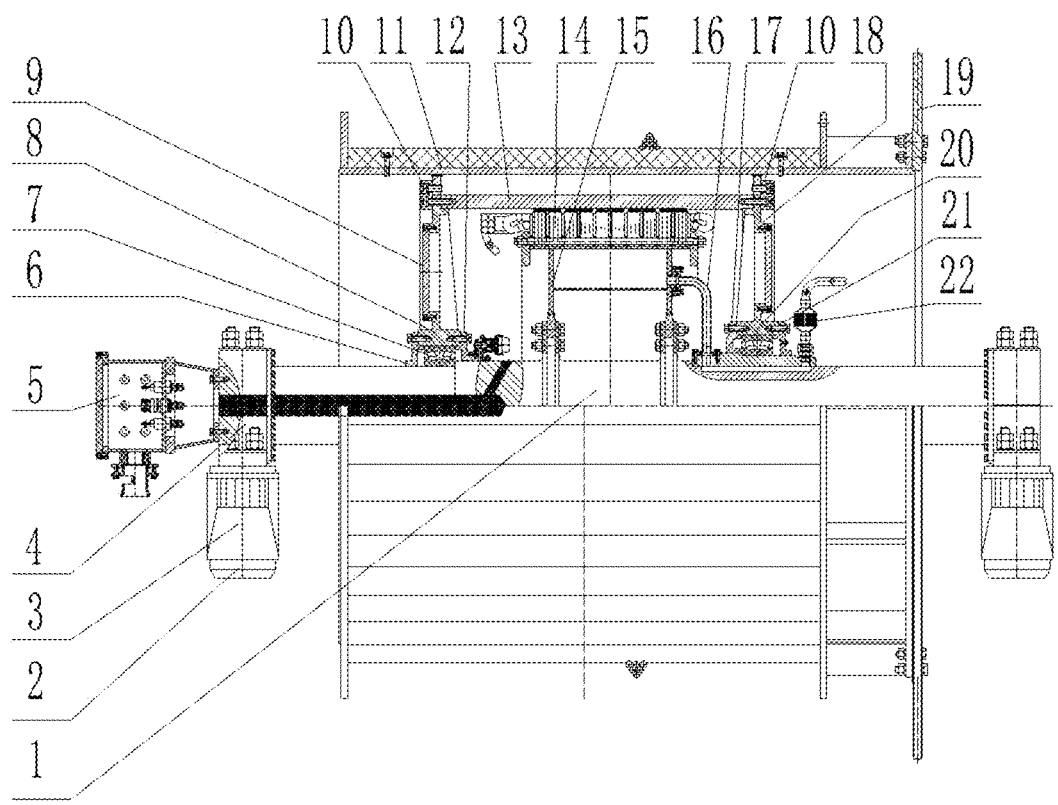
FIG. 1 illustrates a schematic diagram of a mine explosion-isolating winch with a built-in type permanent magnet motor provided by an embodiment of the disclosure.

An embodiment of the disclosure provides a mine explosion-isolating hoisting device with a built-in type permanent magnet motor, which includes: a spindle, a permanent magnet motor stator, a drum and a permanent magnet motor external rotor.

The spindle is fixed on the ground.

The permanent magnet motor stator is fixed on the spindle.

The drum rotates relative to the spindle, and the drum surrounds the spindle circumferentially.

The permanent magnet motor external rotor is fixed by a spoke plate and rotates relative to the spindle.

The drum is connected to the permanent magnet motor external rotor via an isolating disc.

A radial distance between an outer circumferential surface of the permanent magnet motor external rotor and an inner wall of the drum is greater than a preset value.

For the ease of simplicity hereinafter, the permanent magnet motor stator is referred to as a stator, and the permanent magnet motor external rotor is referred to as an external rotor.

Herein, the spindle is fixed on the ground or other fixing facilities on the ground, and is unmovable. The stator is mounted on the spindle. The stable is also unmovable. The drum rotates relative to the spindle. The external rotor is mounted in the drum. The rotation of the drum relative to the spindle is a rotation of the external rotor relative to the stator. A hoisting rope is wound on the drum. The rotation of the drum may drive the hoisting rope to move up and down, that is, to hoist a hoisted object in a well.

Herein, the radial distance between the outer circumferential surface of the external rotor and the inner wall of the drum is greater than the preset value, which is intended to ensure that a load exerted by the hoisting rope on the drum is not transferred to the external rotor, and further ensure that an explosive force in the motor is not transferred to the drum. The preset value is a value for ensuring that the explosive force in the motor is not transferred to the drum, and the value is not defined.

The mine explosion-isolating hoisting device with a built-in type permanent magnet motor provided by the embodiment of the disclosure separates an external rotor and a drum by a preset distance in a radial direction, so that a load borne on the drum is not transferred to the external rotor, thus guaranteeing that change values of an air gap between the external rotor and a stator iron core of a permanent magnet motor and an explosion-isolating gap on an explosion-isolating junction surface of the permanent magnet motor due to an external load are within a preset range. The disclosure can improve the reliability and operation stability of the hoisting device.

In other some embodiments of the disclosure, the spoke plate is respectively disposed on two ends of the permanent magnet motor external rotor; an outer end of the spoke plate is fixed on a cylindrical housing, and an inner end of the spoke plate is connected to the spindle via a bearing; and one end of the isolating disc is fixed on the inner wall of the drum, and the other end of the isolating disc is fixed on the outer end of the spoke plate. The external rotor is connected to the drum via the isolating disc, so that the external rotor does not directly contact with the drum. The structure is simple and the implementation is convenient, thus being a more preferred implementation manner.

Specifically, the isolating disc is fixed on the inner wall of the drum via a connecting disc. One end of the connecting disc is fixed on the inner wall of the drum by welding, and the other end of the connecting disc is fixed on the isolating disc via threaded connection.

As a bearing body, the drum of the device bears a bending stress, a hoisting load tensile force, a radial fluctuation impact stress and the like which change in real time in operation. In order to prevent deformation of the external rotor due to an action of the above complex force from causing a change of an air gap of the motor, an unstable working performance of the motor and a failure of the explosion-isolating effect, the drum and the external rotor are designed in a separated structure in this embodiment of the disclosure. Specifically, the drum is fixedly connected to the external rotor via the isolating disc, so that a rotary moment of the external rotor is transferred to the drum via the isolating disc, thus driving the drum to rotate. However, the load exerted by the hoisting rope on the drum is not transferred to the external rotor, that is, the external rotor only bears the rotary moment of the explosion-isolating permanent magnetic motor and does not bear a radial force exerted by the hoisting rope on the drum.

Further, compared with the mine explosion-isolating hoisting device with a built-in type permanent magnet motor in the related art, the drum in this embodiment of the disclosure does not serve as an explosion-isolating shell of the permanent magnetic motor but the external rotor serves as the explosion-isolating shell of the permanent magnetic motor. With such a structural design in which the drum is separated from the external rotor, the structure of the mine explosion-isolating hoisting device with a built-in type permanent magnet motor in this embodiment of the disclosure is optimized, that is, the deformation generated by the drum under an action of the load exerted by the hoisting rope does not allow the explosion-isolating structure of the external rotor shell to change, and makes an explosion-isolating performance more stable. Meanwhile, there is no influence on the air gap of the permanent magnet motor and the permanent magnet motor has a more stable power performance. Furthermore, the drum only bears an acting force exerted by the hoisting rope and does not bear the action of the explosive force in the motor, thus being safer.

In other some embodiment of the disclosure, the permanent magnet motor external rotor includes a cylindrical housing and an even group of permanent magnets fixed on an inner wall of the cylindrical housing, each group of permanent magnets are arranged along an axial direction by multiple permanent magnets having same magnetic poles, and each permanent magnet in a same group is deviated for a preset angle to one side in sequence on the axial direction.

Generally, when the permanent magnet motor uses a straight pole type structure, a resisting moment is generated. The motor cannot be started until it overcomes the resisting moment and is not liable to implement ultra-low speed start. Meanwhile, many ultraharmonic components are generated and the additional loss is large. In view of this, this embodiment of the disclosure uses, along an axial direction of the motor, staggered deviation for permanent magnets located on the external rotor, which is equivalent to an oblique pole of the external rotor.

Such a measure mainly has the following beneficial effects: 1) a cogging torque is weakened significantly; and when the external rotor rotates, it is tangent to a magnetic line of force of the stator continuously and sequentially along the axial direction, so that the resisting torque during a start stage is small and the ultra-low speed and stable rotation is implemented; 2) the torque pulsation is effectively reduced, the damage to the motor bearing is reduced, and a service life of the motor bearing is prolonged; and 3) the vibration is reduced, and an electromagnetic noise is lowered. Therefore, the above technical solution is a more preferred implementation manner.

Further, this embodiment of the disclosure further uses segmental staggered deviation of the permanent magnets, with the following advantages: 1) compared with the use of a whole permanent magnet, the segmental permanent magnet is machined more easily and is not broken easily due to a large fragility, so the machining and manufacturing cost is reduced; a mechanical strength is improved, thus the permanent magnet is applied to batch production; and the service life of the motor is prolonged; and 2) compared with the whole permanent magnet, the segmental permanent magnet has reduced vortex and stray losses, reduced heat and an improved efficiency of the motor, thus preventing high-temperature demagnetization of the permanent magnet. Therefore, the above technical solution is a more preferred implementation manner.

In other some embodiments of the disclosure, at least one explosion-isolating junction surface is provided at a junction between the cylindrical housing and the spoke plate, and a length, a gap and a surface roughness of the explosion-isolating junction surface are all in conformity to a preset requirement.

In other some embodiments of the disclosure, the device further includes a cooling apparatus for cooling the permanent magnet motor stator, the cooling apparatus includes a cooling liquid cavity for accommodating a cooling liquid, and at least one outer wall of the cooling liquid cavity is propped against a stator iron core of the stator. As the mine explosion-isolating hoisting device with a built-in type permanent magnet motor generates a large amount of heat during operation, the temperature of the motor rises and the overhigh temperature may make the permanent magnet demagnetized, the cooling apparatus is necessary. The cooling apparatus in this embodiment of the disclosure uses a liquid cooling technology. The liquid cooling technology has a better cooling effect, thus being a more preferred implementation manner.

In other some embodiments of the disclosure, the cooling liquid cavity is a sealed annular cavity surrounding an inner wall of the stator iron core, and an outer circumferential surface of the sealed annular cavity is propped against the inner wall of the stator iron core. In this way, a cooling area is larger, thus being a more preferred implementation manner.

In other some embodiments of the disclosure, the cooling apparatus further includes a cooling liquid pipeline for conveying the cooling liquid from the outside, and one end of the cooling liquid pipeline leads into the cooling liquid cavity, and the other end of the cooling liquid pipeline extends out of the permanent magnet motor via the spindle; and the cooling liquid pipeline is provided, at a position outside the permanent magnet motor, with an explosion-isolating pipeline for performing explosion isolation on the cooling pipeline, and the explosion-isolating pipeline has multiple flow channels capable of circulating the cooling liquid. By means of the explosion-isolating pipeline, an explosive spark in the motor may be prevented from escaping to be out of the motor via the cooling liquid pipeline to generate a danger, thus being a more preferred implementation manner. Herein, the explosion-isolating pipeline is a pipeline provided with a micropore structural element therein. The micropore structural element has multiple flow channels which can circulate the cooling liquid but the explosive spark cannot pass through the multiple flow channels.

In other some embodiments of the disclosure, the device further includes a stator support, the stator support includes at least two support plates supporting the stator iron core on two ends of the stator iron core respectively, and one end of the support plate is fixed on the spindle, and the other end of the support plate is configured to support the stator iron core. In this way, the self weight of the whole stator is light and the load is reduced, thus being a more preferred implementation manner. The stator support further includes a propping ring propped against an inner circumference of the stator iron core, and a sealing ring connecting the two support plates and having a preset distance away from the propping ring; and the propping ring, the sealing ring and the two support plates are enclosed to form the cooling liquid cavity. That is, four sides of the cooling liquid cavity are enclosed without leakage. In this way, in addition to the support for the stator iron core, the stator support is also configured to provide the cooling liquid cavity, thus being a more preferred implementation manner.

In other some embodiments of the disclosure, the spindle includes a wiring channel for connecting a lead wire of the stator to a power supply, and one end of the wiring channel axially penetrates through an end surface of one end of the spindle along a central line of the spindle, and the other end of the wiring channel penetrates out along a radial direction of the spindle at a corresponding position of the stator; and an epoxy resin for blocking a sectional space of the wiring channel is further included in the wiring channel, and the lead wire of the stator passes through the epoxy resin. In this way, the explosive spark in the motor can be prevented from escaping to be out of the motor via the wiring channel to generate a danger, and the overlap of the explosive pressure can also be prevented, thus being a more preferred implementation manner.

Specifically, after the lead wire of the stator passes through the wiring channel, the fluid epoxy resin is poured into the wiring channel; and after the epoxy resin is cured, the wiring channel is blocked.

In other some embodiments of the disclosure, the device further includes a magnetic pole position detection apparatus, the magnetic pole position detection apparatus includes a sine-cosine encoder, and the sine-cosine encoder is fixed on the spindle, corresponding to the permanent magnet motor external rotor, in the cylindrical housing. With such a manner, a position of a magnetic pole may be detected, thus guaranteeing the stability of a power performance of the motor and being a more preferred implementation manner. The sine-cosine encoder is a common detection apparatus for detecting an angular displacement, and will not be repeated herein.

In order to understand the disclosure more clearly, the disclosure is further described below in detail in combination with the accompanying drawings and specific embodiments. It should be understood that the specific embodiments described herein are intended to explain the disclosure but not limit the disclosure. The described embodiments are merely a part of embodiments, rather than all embodiments, of the disclosure. All other embodiments obtained by the person of ordinary skill in the art based on the embodiments of the disclosure without creative efforts shall pertain to the protection scope of the disclosure.

Figure 2:
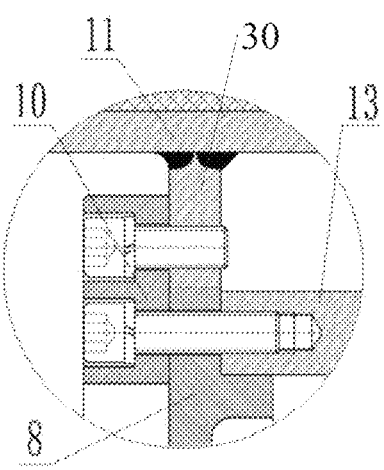
FIG. 2 illustrates a schematic diagram showing that a drum and a permanent magnetic motor external rotor are connected via an isolating disc in a mine explosion-isolating winch with a built-in type permanent magnet motor provided by an embodiment of the disclosure.

An embodiment of the disclosure provides a permanent magnetic motor built-in explosion-isolating winch. It can be understood that the technical solutions of this embodiment may also be used on other permanent magnetic motor built-in explosion-isolating hoisting devices. As shown in FIG. 1 and FIG. 2, the permanent magnetic motor built-in explosion-isolating winch includes a spindle 1, a stator 14, an external rotor 13 and a drum 11. The spindle 1 is fixed on the ground, the stator 14 is fixed on the spindle 1, the drum surrounds the spindle 1 from a circumference of the spindle 1 and rotates relative to the spindle 1, the external rotor 13 is fixed on an inner wall of the drum, and a radial distance between an outer circumferential surface of the permanent magnetic motor external rotor 13 and an inner wall of the drum is greater than a preset value, thus guaranteeing that a load exerted by a hoisting rope on the drum is not transferred to the external rotor 13.

Specifically, the motor external rotor 13 makes a rotary circumferential motion around the spindle 1 via a double row self-aligning roller bearing, thus achieving synchronous rotation of the permanent magnetic motor and directly driving the drum of the winch to rotate. The double row self-aligning roller bearing is respectively labeled as 7 and 20.

In this embodiment, the device further includes an isolating disc 10; the external rotor 13 is connected to the drum via the isolating disc 10; a spoke plate, that is, the spoke plates 8 and 18, is respectively disposed on two ends of the permanent magnet motor external rotor; and an outer end of the spoke plate is fixed on a cylindrical housing, and an inner end of the spoke plate is connected to the spindle via a bearing. One end of the isolating disc 10 is fixed on an inner wall of the drum, and the other end of the isolating disc 10 is fixed on the outer end of the spoke plate. Through the isolating disc 10, the external rotor 13 is "isolated" from the drum. In this way, it is assured that the load exerted by the hoisting rope on the drum is not transferred to the external rotor 13. Specifically, the above may be referred to FIG. 3 and FIG. 4.

Figure 3:
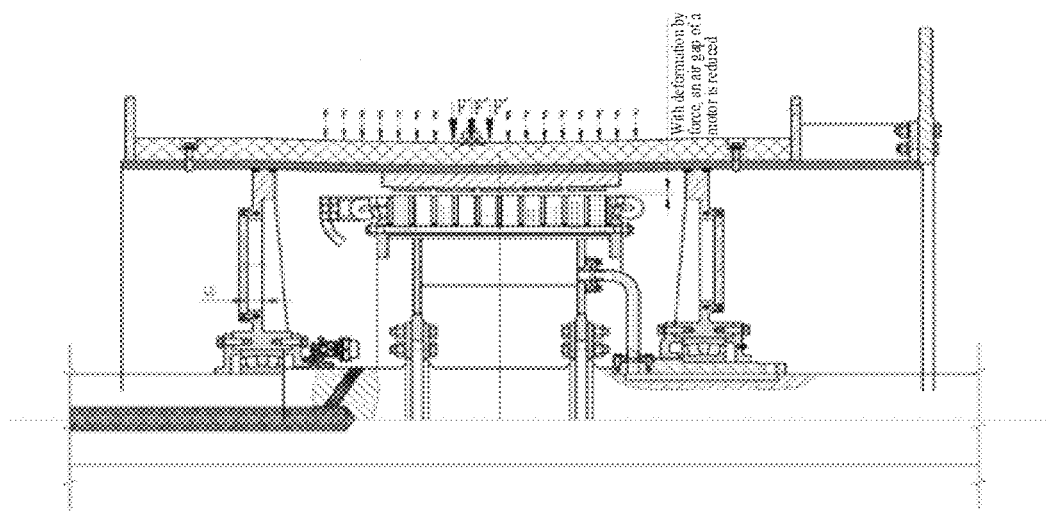
FIG. 3 illustrates a schematic diagram of stress analysis when a permanent magnetic motor external rotor is directly mounted on an inner wall of a drum in the related art.
Figure 4:
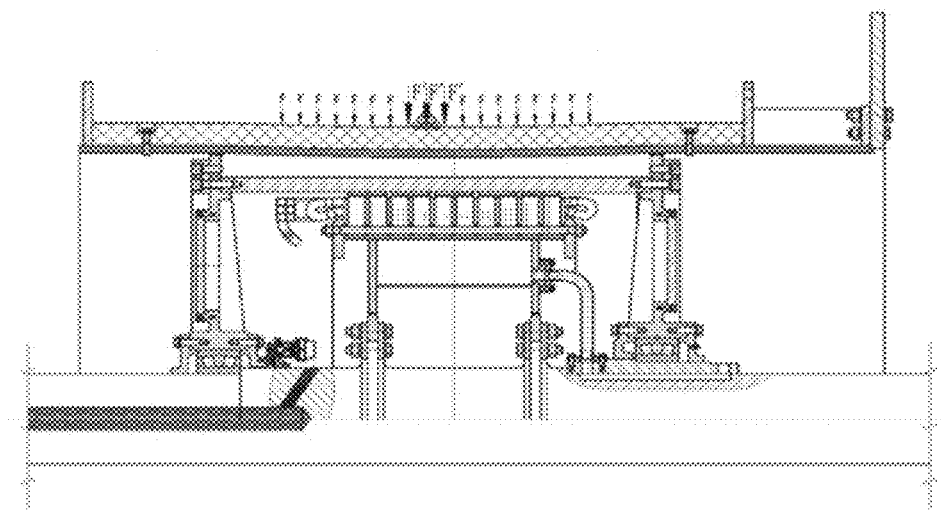
FIG. 4 illustrates a schematic diagram of stress analysis of a drum in a mine explosion-isolating winch with a built-in type permanent magnet motor provided by an embodiment of the disclosure.

FIG. 3 illustrates a schematic diagram of stress analysis when a permanent magnetic motor external rotor 13 is directly mounted on an inner wall of the drum in the related art. FIG. 4 illustrates a schematic diagram of stress analysis of a drum in a mine explosion-isolating winch with a built-in type permanent magnet motor provided by an embodiment of the disclosure. As can be seen from the figures, the F is a radial acting force exerted by the hoisting rope on the drum, and the F' is a maximum value of the radial acting force exerted by the hoisting rope connected to a load on the drum. Both the F and the F' will make the drum deform in a radial direction; and particularly, the F' tends to cause a large deformation of the drum. Therefore, in the related art, in a case where the external rotor 13 shell and the drum are one piece (or integrated), a position of a permanent magnet changes inevitably, which certainly results in that a change value of an air gap of the motor is greater than an allowed value, or even an electromagnetic torque of the motor changes, and thus a power performance of the motor is affected. In the mine explosion-isolating winch with a built-in type permanent magnet motor in this embodiment, as the external rotor 13 and the drum are separated by a preset distance in a radial direction, the external rotor 13 is not affected by the drum and the stability of the power performance of the motor can be guaranteed.

It is to be noted that characters in FIG. 3 is "With deformation by force, an air gap of a motor is reduced".

Specifically, the drum 11 is fixedly connected to the external rotor 13 via the isolating disc 10, so that a rotary moment of the external rotor 13 is transferred to the spoke plates 8 and 18 via a bolt, and the spoke plates 8 and 18 transfer the rotary moment to the drum 11 via a bolt and the isolating disc 10. As a bearing body of the explosion-isolating winch, the drum 11 only bears the load exerted by the hoisting rope and the rotary moment of the permanent magnetic motor, and does not serve as an explosion-isolating shell of the explosion-isolating permanent magnetic motor. Meanwhile, as the housing of the explosion-isolating motor, the external rotor 13 only bears the rotary moment of the explosion-isolating permanent magnetic motor and does not bear a radial force exerted by the hoisting rope on the drum 11. The above implements a separated structural design of the drum and the external rotor 13, so that the structure is optimized. That is, with the deformation of the drum 11 under an action of the load exerted by the hoisting rope, an explosion-isolating junction surface at a junction between the external rotor 13 and the spoke plates 8 and 18 does not change, and the air gap of the explosion-isolating permanent magnet motor is not affected. Herein, the spoke plate supports the housing of the external rotor 13, one end of the spoke plate is connected to the spindle 1 via a double row self-aligning roller bearing 7, 20, and the other end of the spoke plate is fixed on the cylindrical housing via threaded connection.

More specifically, the isolating disc 10 is fixed on the inner wall of the drum 11 via a connecting disc 30. One end of the connecting disc 30 is fixed on the inner wall of the drum 11 by welding, and the other end of the connecting disc 30 is fixed on the isolating disc 10 via threaded connection.

In order to enable the motor to meet an explosion-isolating requirement, two explosion-isolating junction surfaces, that are, explosion-isolating seam junction surfaces at A-1 and A-2, are disposed at junctions between the external rotor 13 and the spoke plate 8 and 18. A length, a gap and a surface roughness of the explosion-isolating junction surface are all in conformity to the national standard GB3836.

Figure 5:
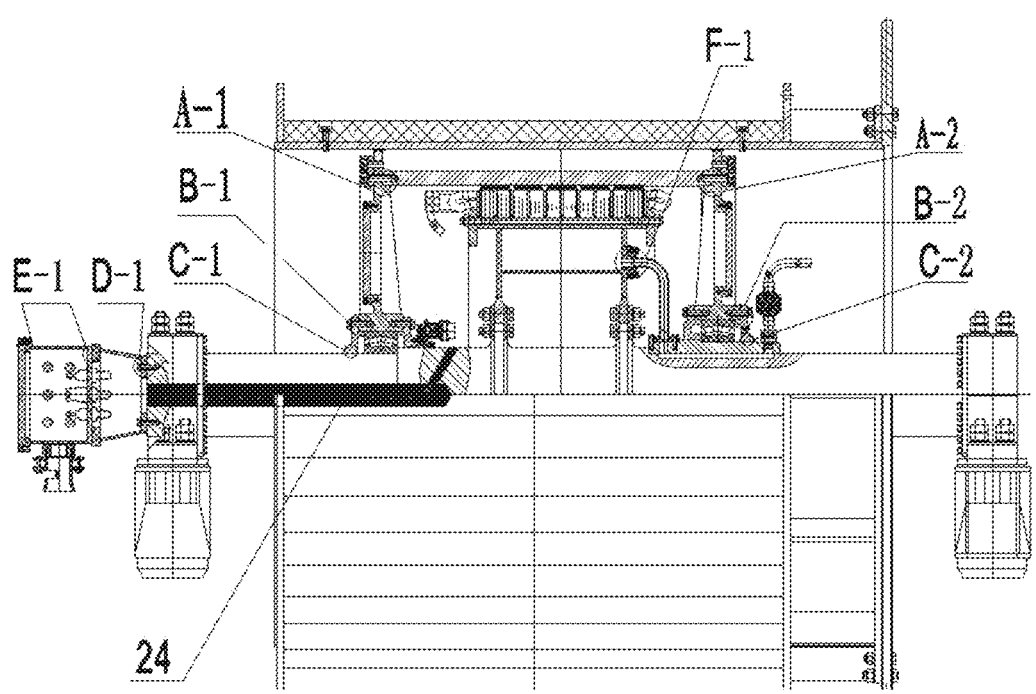
FIG. 5 illustrates a schematic diagram of a position of each explosion-isolating junction surface of a permanent magnet motor in a mine explosion-isolating winch with a built-in type permanent magnet motor provided by an embodiment of the disclosure.
Figure 6:
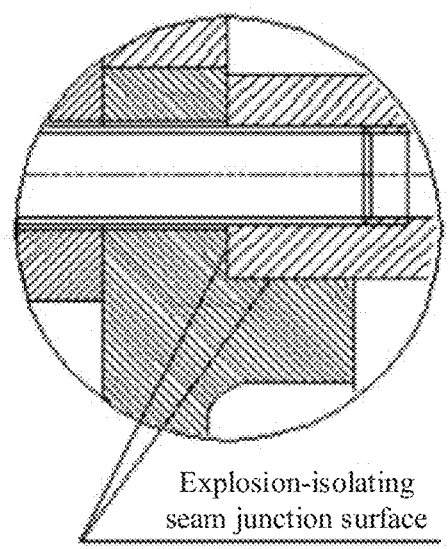
FIG. 6 is a partial enlarged schematic diagram at A-1 in FIG. 5 (that is, a schematic diagram of an explosion-isolating junction surface).
Figure 7:
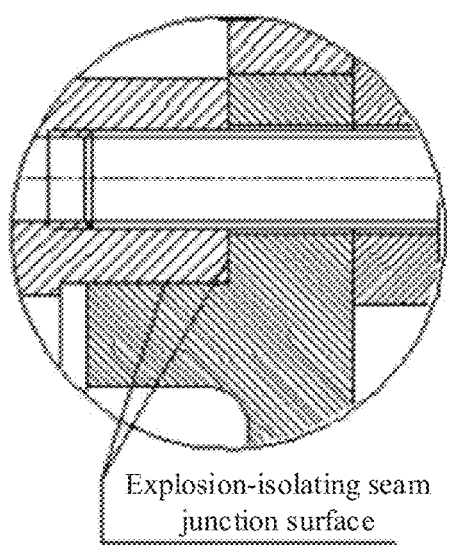
FIG. 7 is a partial enlarged schematic diagram at A-2 in FIG. 5 (that is, a schematic diagram of an explosion-isolating junction surface).
Figure 8:
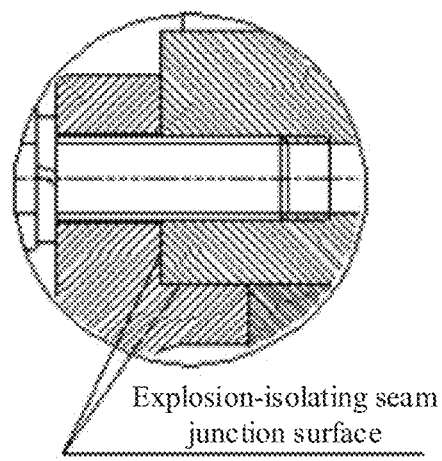
FIG. 8 is a partial enlarged schematic diagram at B-1 in FIG. 5 (that is, a schematic diagram of an explosion-isolating junction surface).
Figure 9:
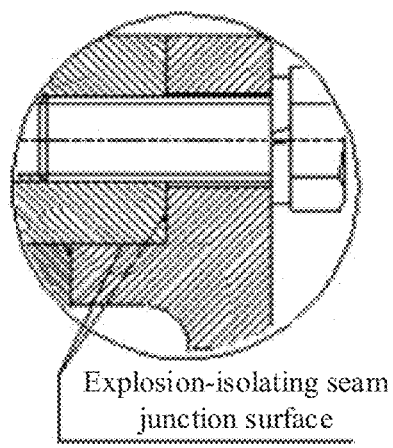
FIG. 9 is a partial enlarged schematic diagram at B-2 in FIG. 5 (that is, a schematic diagram of an explosion-isolating junction surface).
Figure 10:
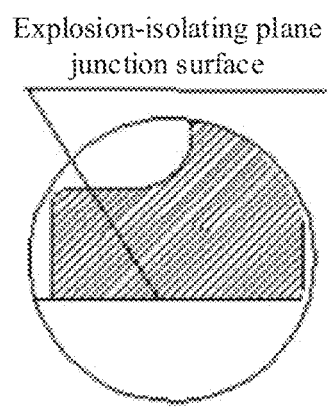
FIG. 10 is a partial enlarged schematic diagram at C-1 in FIG. 5 (that is, a schematic diagram of an explosion-isolating junction surface).
Figure 11:
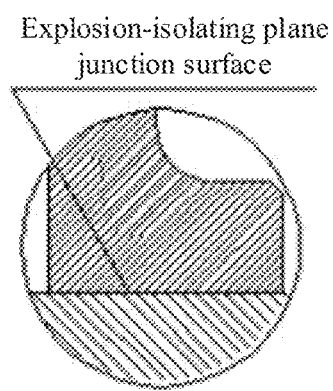
FIG. 11 is a partial enlarged schematic diagram at C-2 in FIG. 5 (that is, a schematic diagram of an explosion-isolating junction surface).
Figure 12:
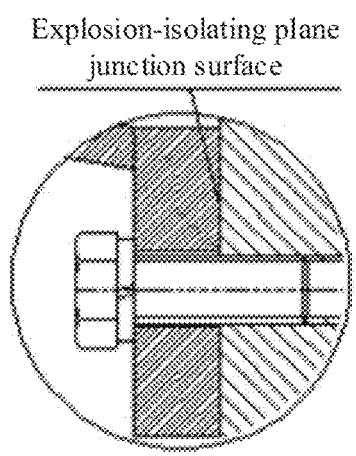
FIG. 12 is a partial enlarged schematic diagram at D-1 in FIG. 5 (that is, a schematic diagram of an explosion-isolating junction surface).
Figure 13:
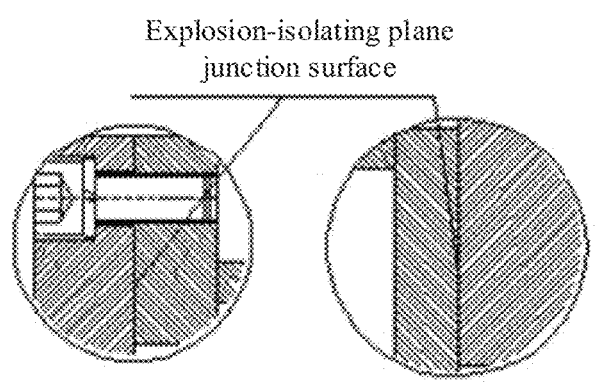
FIG. 13 is a partial enlarged schematic diagram at E-1 in FIG. 5 (that is, a schematic diagram of an explosion-isolating junction surface).
Figure 14:
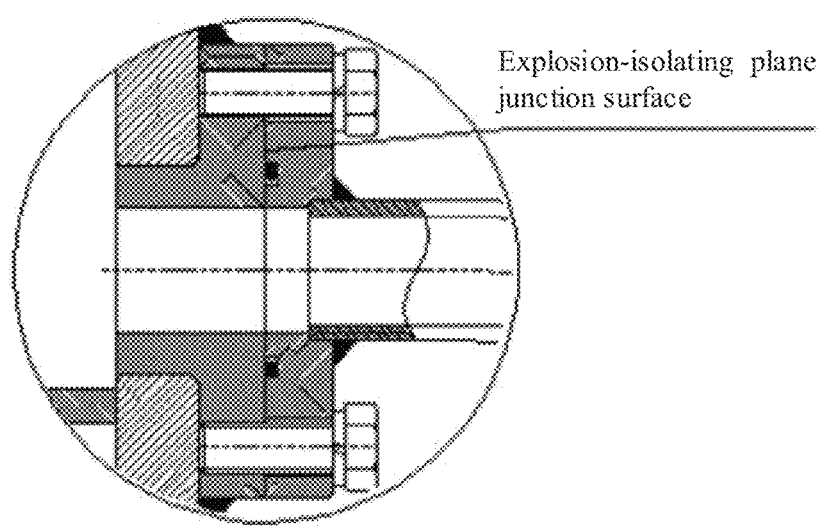
FIG. 14 is a partial enlarged schematic diagram at F-1 in FIG. 5 (that is, a schematic diagram of an explosion-isolating junction surface).

Further, in order to enable the whole motor to meet the explosion-isolating requirement, the permanent magnet motor built-in explosion-isolating winch in this embodiment is provided with an explosion-isolating junction surface at other multiple parts, which is referred to FIG. 5 specifically. As can be seen from the figure, the explosion-isolating junction surface is provided at A-1, A-2, B-1, B-2, C-1, C-2, D-1, E-1 and F-1. The length, the gap and the surface roughness of the explosion-isolating junction surface are all in conformity to the national standard GB3836. Each explosion-isolating junction surface may be referred to FIGS. 6-14. During design, finite element analysis may be performed on the motor in an extreme working condition so as to guarantee that a variation of the explosion-isolating junction surface and each explosion-isolating gap meet the explosion-isolating requirement. As the circumstance may require, other explosion-isolating junction surfaces may also be increased to guarantee that the motor meets the explosion-isolating requirement. Specifically, the explosion-isolating junction surface includes an explosion-isolating seam junction surface and an explosion-isolating plane junction surface.

Furthermore, as the external rotor 13 is "isolated" from the drum, the load of the drum is not transferred to the external rotor 13, and each explosion-isolating junction surface does not change due to the load, so that an explosion-isolating performance is more stable.

Moreover, a first bearing end cap 6 and a second bearing end cap 12 are respectively provided on two ends of the double row self-aligning roller bearing 7, and a third bearing end cap 17 and a fourth bearing end cap 21 are provided on two ends of the double row self-aligning roller bearing 20. The bearing end cap has the effects of protecting the two ends of the bearing safely and forming explosion-isolating protection.

Specifically, the explosion-isolating junction surface, that is, the explosion-isolating junction surfaces B-1 and B-2, is also provided between the bearing end cap and the spoke plates 8 and 18. The B-1 and B-2 are the explosion-isolating seam junction surface.

Specifically, the explosion-isolating junction surface, that is, the explosion-isolating junction surfaces C-1 and C-2, is also provided between the bearing end cap and the spindle 1. The C-1 and C-2 are the explosion-isolating plane junction surface.

Figure 16:
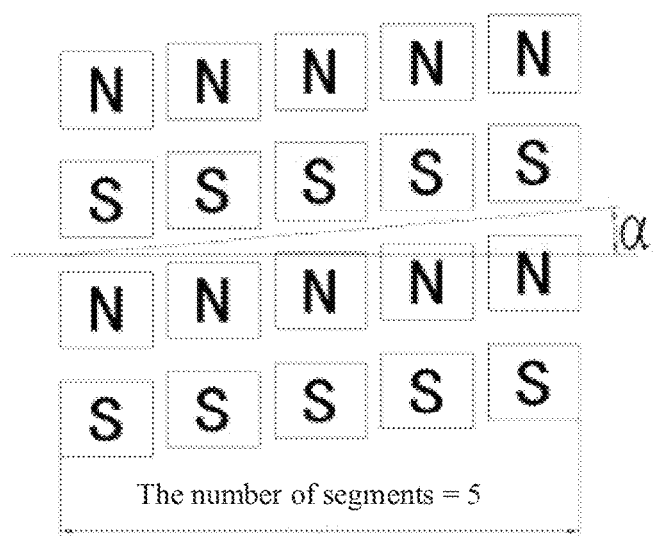
FIG. 16 illustrates a cross-sectional schematic diagram of an explosion-isolating pipeline in a mine explosion-isolating winch with a built-in type permanent magnet motor provided by an embodiment of the disclosure.

In this embodiment, as shown in FIG. 16, the external rotor 13 includes a cylindrical housing and an even group of permanent magnets fixed on an inner wall of the cylindrical housing, each group of permanent magnets are arranged along an axial direction by multiple permanent magnets having same magnetic poles, and each permanent magnet in a same group is deviated for a preset angle to one side in sequence on the axial direction. Such a method for arranging the permanent magnets is equivalent to an oblique pole of the external rotor 13, and may reduce a resisting moment to implement the stability. The torque pulsation may also be reduced, so that damage to the motor bearing, that is, the damage to the bearing 7 and the bearing 20, is reduced. And the vortex and stray losses may further be reduced to prevent high-temperature demagnetization of the permanent magnet.

Specifically, in this embodiment, the deviation is divided into 5 segments. Each segment is deviated in a staggered manner, with a consistent deviation direction. A deviation angle α of each segment of permanent magnet is determined via simulation software analysis, so as to ensure that segmentation and stagger of the permanent magnet are implemented within a pole pitch of the magnetic pole of one permanent magnet, adjacent magnetic poles are not axially overlapped, and the attenuation of a density of the rotary torque is prevented from being excessively large.

In this embodiment, the device further includes a stator support 15, and the stator support 15 includes support plates, a propping ring and a sealing ring. Two support plates are provided, and respectively located on two ends of the stator iron core; one end of the support plate is fixed on the spindle 1, and the other end of the support plate is configured to support the stator iron core; and the propping ring, the sealing ring and the two support plates are enclosed to form the cooling liquid cavity. Specifically, the stator support 15 in this embodiment is welded into an integrated piece by using low alloy steel Q345.

In this embodiment, the device further includes a cooling apparatus for cooling the stator 14, the cooling apparatus includes a cooling liquid cavity for accommodating a cooling liquid, and at least one outer wall of the cooling liquid cavity is propped against a stator iron core of the stator 14. In this embodiment, the cooling liquid cavity is a sealed annular cavity surrounding an inner wall of the stator iron core, and an outer circumferential surface of the sealed annular cavity is propped against the inner wall of the stator iron core.

In this embodiment, the cooling apparatus further includes a cooling liquid pipeline 16 for conveying the cooling liquid from the outside, and one end of the cooling liquid pipeline 16 leads into the cooling liquid cavity, and the other end of the cooling liquid pipeline 16 extends out of the permanent magnet motor via the spindle 1. Specifically, the cooling liquid enters the cooling liquid cavity via the cooling liquid pipeline 16 from a cooling station, and brings away heat generated by power-on of a winding of the stator 14 to form a closed-loop cooling system.

Figure 15:
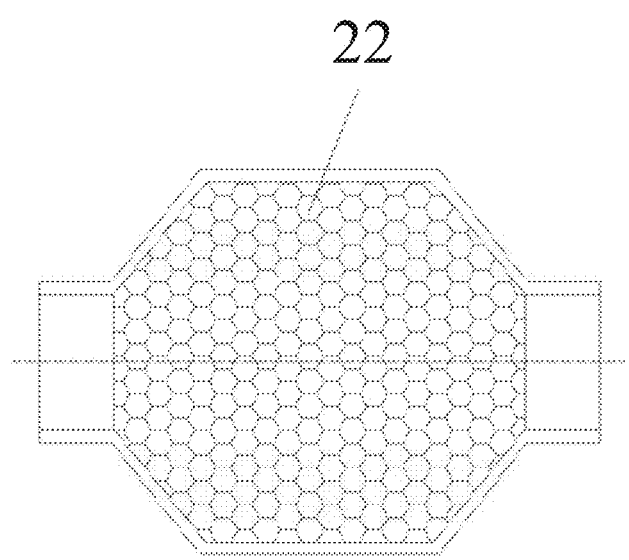
FIG. 15 illustrates a schematic diagram of a deviated distribution of a permanent magnet in a mine explosion-isolating winch with a built-in type permanent magnet motor provided by an embodiment of the disclosure.

Specifically, the cooling liquid pipeline 16 is provided with an explosion-isolating pipeline 22 at a position outside the permanent magnet motor, and the explosion-isolating pipeline 22 has multiple flow channels capable of circulating the cooling liquid, specifically as shown in FIG. 15. Herein, the explosion-isolating pipeline 22 is a pipeline provided with a micropore structural element therein. The micropore structural element has multiple flow channels which can circulate the cooling liquid but an explosive spark cannot pass through the multiple flow channels. More specifically, the micropore structural element is manufactured with a powder metallurgy technology.

Specifically, the cooling liquid pipeline 16 further includes a cooling liquid passing groove disposed on the spindle 1, that is, a groove formed on the spindle 1 and extending axially; two ends of the groove are provided with an outlet and other parts of the groove are sealed; and the two ends of the groove are respectively connected to the cooling liquid pipeline 16. More specifically, an explosion-isolating junction surface is provided at a junction between the cooling liquid pipeline 16 and the stator support, that is, the above explosion-isolating junction surface F-1. More specifically, the cooling liquid pipeline 16 is machined by a stainless steel seamless steel tube.

In this embodiment, the spindle 1 includes a wiring channel for connecting a lead wire of the stator 14 to a power supply, and one end of the wiring channel axially penetrates through an end surface of one end of the spindle 1 along a central line of the spindle 1, and the other end of the wiring channel penetrates out along a radial direction of the spindle 1 at a corresponding position of the stator 14; and an epoxy resin 24 for blocking a sectional space of the wiring channel is further included in the wiring channel, and referring to FIG. 5, the lead wire of the stator 14 passes through the epoxy resin 24. Specifically, after the lead wire of the stator 14 passes through the wiring channel, the fluid epoxy resin is poured into the wiring channel; and after the epoxy resin is cured, the wiring channel is blocked.

A junction box 5 to which the power supply is connected is disposed outside the motor. The junction box 5 is mounted on a support seat 4, is completely independent of the cavity of the motor (that is, the explosion-isolating cavity), and has no direct lead wire structure. A connecting surface D-1 between the junction box 5 and the support seat 4 and a connecting surface E-1 of the junction box 5 use the explosion-isolating junction surface, and meet an explosion-isolating requirement. A cable wire in the junction box 5 enters the motor via the wiring channel of the spindle 1.

Figure 17:
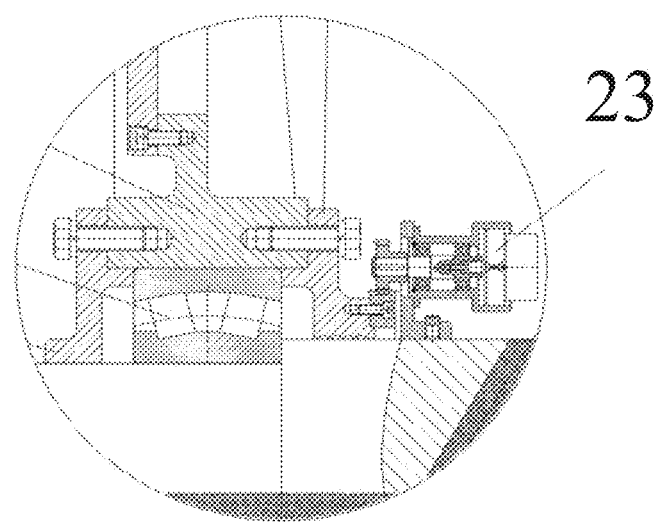
FIG. 17 illustrates a schematic diagram of a sine-cosine encoder in a mine explosion-isolating winch with a built-in type permanent magnet motor provided by an embodiment of the disclosure.

In this embodiment, the device further includes a magnetic pole position detection apparatus, the magnetic pole position detection apparatus includes a sine-cosine encoder 23 as shown in FIG. 17, and the sine-cosine encoder 23 is fixed on the spindle 1 in the cylindrical housing of the external rotor 13. With such a manner, a position of a magnetic pole may be detected, thus guaranteeing the stability of a power performance of the motor.

In this embodiment, a brake disc 19 is fixedly mounted outside a right end of the drum 11 via a bolt. The brake disc 19 is configured to brake and decelerate the drum 11.

In this embodiment, a motor end cover plate 9 is installed outside the motor; and after the motor end cover plate 9 is opened, a state of the external rotor 13 may be observed so as to make a repair and replacement conveniently.

In order to mount the permanent magnet motor built-in explosion-isolating winch in this embodiment on the ground, the winch further includes a foundation plate 2 fixed on the ground, a foundation beam component 3 fixed on the foundation plate 2, and the support seat 4 fixed on the foundation beam component 3; and the spindle 1 is mounted on the support seat 4.

The permanent magnet motor built-in explosion-isolating winch in this embodiment reduces a transmission step of the hoisting device, improves a transmission efficiency, and decreases a floor area for mounting the hoisting device. By assembling the hoisting device into a large motor structure as a whole, only the foundation plate 2 and the foundation beam component 3 need to be fixed to complete the mounting. Therefore, a mounting efficiency of the device is improved, a centering performance in mounting is good and an air gap of the motor can be effectively controlled. The permanent magnet motor is of a direct driven type, and is compact in structure, safe and high in reliability, efficient and energy-saving. By virtue of a frequency converter, ultra-low frequency and large-torque start as well as low-speed operation can be implemented, an ultraharmonic is not generated, a high-speed bearing turns out to be unnecessary and the like, so the disclosure is obviously advantageous compared with a traditional hoisting device.

Additionally, with optimization on an explosion-isolating structure, multiple explosion-isolating measures are taken, for example, the explosion-isolating junction surface is provided at multiple places, the epoxy resin is poured into a space of the wiring channel of the spindle 1, and the explosion-isolating pipeline 22 is used to prevent conduction of the explosive spark, thus the safety and the reliability are high. Compared with the traditional explosion-isolating hoisting device, the disclosure is obviously advantageous. The permanent magnet motor built-in explosion-isolating winch in this embodiment may replace the existing explosion-isolating hydraulic winch and the traditional explosion-isolating three-phase asynchronous motor and decelerator type winch, and may also solve the problem of the existing permanent magnet motor built-in explosion-isolating winch.

In this embodiment of the disclosure, unless otherwise specified and defined, the term "connection" should be understood broadly, for example, it may be electrical connection, may also be interconnection in two elements, may be direct connection, and may also be indirect connection via an intermediary. The person of ordinary skill in the art may understand the specific meaning of the above term as the case may be.

The term "first/second/third" related in the embodiment of the disclosure is merely for distinguishing similar objects rather than a special order of the object. It may be understood that the "first/second/third" may exchange a special sequence or chronological sequence in an allowed condition.

It should be understood that reference throughout this specification to "one embodiment", "an embodiment", "some embodiments" or the like means that particular features, structures, or characteristics described in connection with the embodiment is included in at least one embodiment of the disclosure. Thus, the appearances of the phrases "in one embodiment", "in an embodiment" or "in some example embodiments" in various places throughout this specification are not necessarily all referring to the same embodiment. Furthermore, the particular features, structures, or characteristics may be combined in any suitable manner in one or more embodiments. It should be further understood that the sequence numbers of the foregoing processes do not mean execution sequences in various embodiments of the disclosure. The execution sequences of the processes should be determined according to functions and internal logics of the processes, and should not be construed as any limitation to the implementation processes of the embodiments of the disclosure. The serial numbers of the embodiments of the disclosure are merely for description and do not represent a preference of the embodiments.

The above are merely a preferred embodiment of the disclosure rather than a limit to a protection scope of the disclosure. Any modification, equivalent replacement, improvement and the like made within a spirit and a principle of the disclosure should be included in the protection scope of the disclosure.

The invention claimed is:

1. A mine explosion-isolating hoisting device with a built-in type permanent magnet motor, comprising:
    a spindle fixed on the ground;
    a permanent magnet motor stator fixed on the spindle;
    a drum rotating relative to the spindle, the drum surrounding the spindle circumferentially;
    a permanent magnet motor external rotor fixed by a spoke plate and rotating relative to the spindle; and
    a cooling apparatus for cooling the permanent magnet motor stator,
    wherein the cooling apparatus comprises a cooling liquid cavity for accommodating a cooling liquid;
    at least one outer wall of the cooling liquid cavity is propped against a stator iron core of the permanent magnet motor stator;
    the drum is connected to the permanent magnet motor external rotor via an isolating disc; and
    a radial distance between an outer circumferential surface of the permanent magnet motor external rotor and an inner wall of the drum is greater than a preset value.

2. The mine explosion-isolating hoisting device with the built-in type permanent magnet motor of claim 1, wherein the spoke plate is respectively disposed on two ends of the permanent magnet motor external rotor; an outer end of the spoke plate is fixed on the permanent magnet motor external rotor, and an inner end of the spoke plate is connected to the spindle via a bearing; and one end of the isolating disc is fixed on the inner wall of the drum, and the other end of the isolating disc is fixed on the outer end of the spoke plate.

3. The mine explosion-isolating hoisting device with the built-in type permanent magnet motor of claim 2, wherein the permanent magnet motor external rotor comprises a cylindrical housing and an even group of permanent magnets fixed on an inner wall of the cylindrical housing, each group of permanent magnets are arranged along an axial direction by multiple permanent magnets having same magnetic poles, and each permanent magnet in a same group is deviated for a preset angle to one side in sequence on the axial direction.

4. The mine explosion-isolating hoisting device with the built-in type permanent magnet motor of claim 3, wherein at least one explosion-isolating junction surface is provided at a junction between the cylindrical housing and the spoke plate, and a length, a gap and a surface roughness of the explosion-isolating junction surface are in conformity to a preset requirement.

5. The mine explosion-isolating hoisting device with the built-in type permanent magnet motor of claim 4, wherein the cooling liquid cavity is a sealed annular cavity surrounding an inner wall of the stator iron core, and an outer circumferential surface of the sealed annular cavity is propped against the inner wall of the stator iron core.

6. The mine explosion-isolating hoisting device with the built-in type permanent magnet motor of claim 5, wherein the cooling apparatus further comprises a cooling liquid pipeline for conveying the cooling liquid from an outside, and one end of the cooling liquid pipeline leads into the cooling liquid cavity, and the other end of the cooling liquid pipeline extends out of the built-in type permanent magnet motor via the spindle; and the cooling liquid pipeline is provided, at a position outside the built-in type permanent magnet motor, with an explosion-isolating pipeline for performing explosion isolation on the cooling liquid pipeline, and the explosion-isolating pipeline has multiple flow channels capable of circulating the cooling liquid.

7. The mine explosion-isolating hoisting device with the built-in type permanent magnet motor of claim 6, wherein the mine explosion-isolating hoisting device further comprises a stator support, the stator support comprises at least two support plates supporting the stator iron core on two ends of the stator iron core respectively, and one end of each of the two support plates is fixed on the spindle, and the other end of each of the two support plates is configured to support the stator iron core; the mine explosion-isolating hoisting device further comprises a propping ring propped against an inner circumference of the stator iron core, and a sealing ring connecting the two support plates and having a preset distance away from the propping ring; and the propping ring, the sealing ring and the two support plates are enclosed to form the cooling liquid cavity.

8. The mine explosion-isolating hoisting device with the built-in type permanent magnet motor of claim 7, wherein the spindle comprises a wiring channel for connecting a lead wire of the permanent magnet motor stator to a power supply, and one end of the wiring channel axially penetrates through an end surface of one end of the spindle along a central line of the spindle, and the other end of the wiring channel penetrates out along a radial direction of the spindle at a corresponding position of the permanent magnet motor stator; and an epoxy resin for blocking a sectional space of the wiring channel is further comprised in the wiring channel, and the lead wire of the permanent magnet motor stator passes through the epoxy resin.

9. The mine explosion-isolating hoisting device with the built-in type permanent magnet motor of claim 8, wherein the mine explosion-isolating hoisting device further comprises a magnetic pole position detection apparatus, the magnetic pole position detection apparatus comprises a sine-cosine encoder, and the sine-cosine encoder is fixed on the spindle, corresponding to the permanent magnet motor external rotor, in the cylindrical housing.

* * * * *